May 25, 1965 J. E. COATES 3,185,238
PNEUMATIC LOADLIFTING AND TRANSLATING MEANS
Filed Oct. 3, 1960 2 Sheets-Sheet 1

INVENTOR.
Edwin Coates

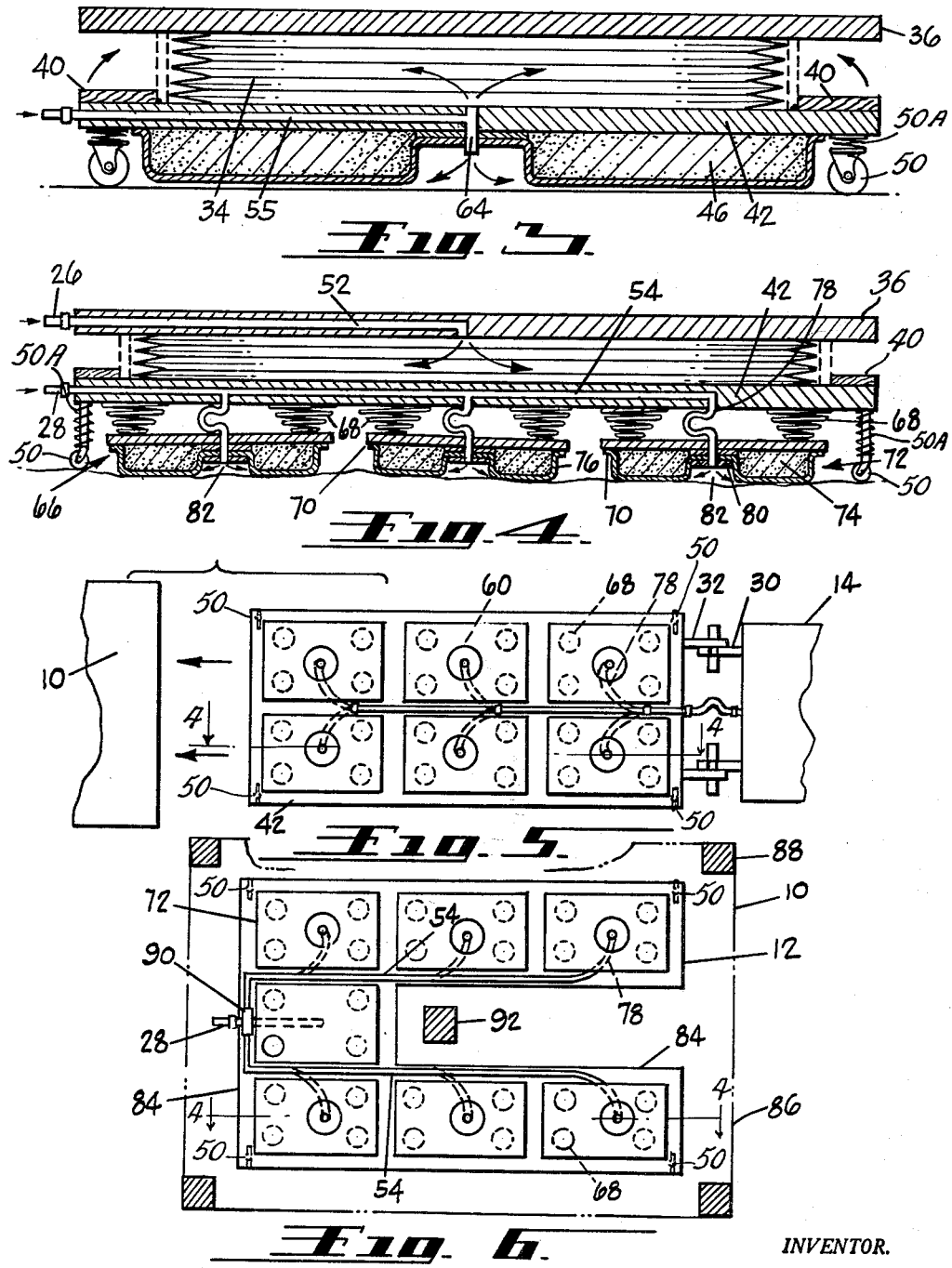

United States Patent Office 3,185,238
Patented May 25, 1965

3,185,238
PNEUMATIC LOADLIFTING AND TRANSLATING
MEANS
J. Edwin Coates, Santa Monica, Calif., assignor to Douglas
Aircraft Company, Inc., Santa Monica, Calif.
Filed Oct. 3, 1960, Ser. No. 59,880
16 Claims. (Cl. 180—7)

This invention relates to means for facilitating the translation of loaded pallets, or other load bearing platforms or the like, by means which substantially reduces the sliding-friction between the loaded platform and the ground, floor, or other supporting surface for the loaded platform. By reducing this sliding-friction, the personal effort required of a worker in moving the loaded platform from one locus to another is very materially reduced and working efficiency is correspondingly increased.

Thus, the provisions of the invention are eminently well suited for adoption in loading and unloading the cargo of an airplane, hitherto an onerous and lengthy task. Thereby, also, the grounded or "gate" time of the airplane is effectively reduced as well as the cost of the airplane's "stevedore" work. Moreover, all the bulky, cumbersome or expensive auxiliary equipment hitherto necessitated in handling cargo, especially for airplanes, is totally eliminated.

As the following matter will manifest, the invention is not, by any means, to be deemed as especially limited to use in handling aircraft cargo; rather, it is quite easily adaptable to use in loading ships, boats, auto trucks, freight cars and all other cargo-carrying vehicles. It is also eminently well adapted for use in merely shifting inventories in a warehouse, store, or the like.

To these and other ends, the invention includes a portable, discrete source or package of pressurized air, or other fluid; means for decouplably coupling same to a pneumatic jack, dolly or the like; means for urging and guiding the pack forwardly so as to dispose the jack under the loaded-platform or pallet; and conduit means flexibly connecting the package to the jack in such manner that the pressurized fluid may be so supplied to the jack that it may be expanded vertically to raise the pallet off its supporting surface and concurrently to "float" the jack, bearing the loaded platform, on a thin, elevated-pressure layer of fluid flowing on or across the lower face of the jack or dolly.

Thus, the load is not directly supported by, or in contact with, the floor, ground, terrain or deck; rather, it rides on a thin, but constantly fed, elevated-pressure layer of air emanating from the dolly. The coefficient of sliding friction between the dolly and loaded platform, and the floor, is thus reducible, sometimes, substantially close to zero. The outstanding advantageousness of the invention is thus apparent.

Among the other unique advantages of the present combination of movable power pack and dolly with a pallet is that the air-layer creating means and mechanism need not be incorporated into each container or pallet, nor does it necessitate a series of valved air sources in the supporting surface or ground plane, both of which arrangements have been used in the past. In effect, therefore, it can be employed as, and for the purposes of, a fork-lift truck and this further enables pallets to be very much simplified, as shown in the present drawings; or, the pallet construction can constitute the actual bottom of a container or tote box.

Further, if the pallet, or if, as herein, the bottom of each palletless container, is provided with short corner legs and a middle leg, the dolly can be positioned under the pallet from the sides or front, or rear ends whichever may be most convenient for stowing the assembled pallet and/or container in a given floor space.

Preferably, but not mandatorily, the pads or feet of the dolly somewhat resemble those disclosed and claimed in U.S. Patent No. 2,918,183 to T. K. Petersen et al., dated December 22, 1959. This fact obtains with reference both to the single pad and to the multiple pad species disclosed herein. In the case of multiple pads or feet, each foot is attached to the dolly by means of large, conical or helically coiled springs, thereby to permit each foot to conform individually to irregularities in the ground-plane and to provide recuperation to stable position of each foot or pad after it has encountered such irregularities.

By way of rendering these, and other, concepts more concrete and readily comprehendible, several species of embodiment of same are representationally illustrated in the accompanying drawings and are described in detail hereinafter.

In these drawings:

FIG. 3 is a similar view of a modified form of airsupply means to the lifting platform and to the underface of the dolly;

FIG. 4 is a similar view of a substantially modified form of the dolly so far as concerns the footing means or ground-confronting face of the dolly;

FIG. 5 is a fragmentary bottom plan view of the combination of the power package, the dolly of FIG. 4 and the pallet; and FIG. 6 is a bottom plan view depicting a C-planform dolly cooperating with a pallet having corner legs and a medial leg whereby to enable the dolly to approach the pallet from many directions other than the one one end of the pallet.

Figure 1:
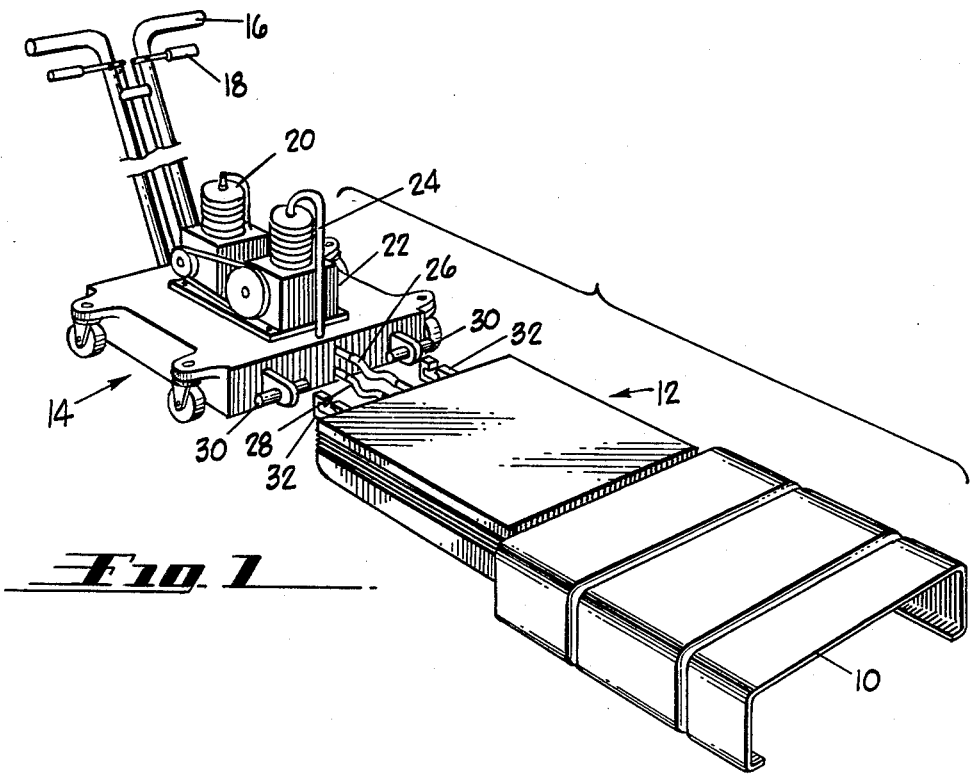
FIG. 1 is an expanded perspective view of the novel present combination of instrumentalities.

Referring now to FIG. 1, this drawing representationally discloses a simple, metal-stamping, light-weight but strong load-bearing pallet 10 which normally rests on the floor but is to be elevated and translated, after loading, by a novel dolly 12 in turn translated and energized pneumatically by a power-pack 14.

The latter is a simple wheeled platform bearing a steering handle 16 and supporting an internal combustion engine, or other prime mover 20. The latter is adapted, by belt or chain drive means, shown, to drive a small air compressor 22, also carried on the platform. The motor and compressor can be feasibly designed to emit 40 p.s.i. pressure from the compressor, but the power pack need not develop more than 3–10 p.s.i. for most usages and hence can be light enough to permit ease of translation and steering.

Pressure-wise, the power pack is connected to the dolly 12 by a lead-out pipe 24 and a pair of flexible conduits, 26 and 28. Members 18 on handle 16 control the flow in conduits 26 and 28 independently through valves, not shown, within the platform. Conduit 26, as shown best in FIG. 2, leads, by means later described, to the jacking-chamber 34, later described, of the dolly, and conduit 28 leads, as later explained, to the flotation surface of the dolly 12, later described.

In order to disconnectibly connect or couple the power pack to the dolly so that the latter may be pushed or pulled along and into position under the pallet by moving the power pack 14, as well as to take the strain off conduits 26 and 28, certain end fittings or male and female coupling means are provided on the confronting ends of pack and dolly. There are two male coupling members 30, each in the form of a transverse, double ended pin on the end-face of the pack, shaped and arranged to engage in complemental and confronting female fittings 32 on the confronting end-face of the dolly, the latter, 32, being shaped and arranged to permit ready, secure coupling and ready de-coupling of pack and dolly, on respective occasions. The coupled length of 30 and 32 is less than that of conduits 26 and 28, to relieve the latter of tension or other stresses.

Coming now to the dolly per se, it consists of a generally flat, rectangular body divided horizontally into an upper chamber and a lower portion. Upper chamber 34 constitutes a jacking, or lift chamber, whereas the lower portion 46, constitutes a floatation, friction-reducing, and rugosity-nullifying means.

The upper chamber is defined by a pallet-lifting plate 36 and a base plate 42 in conjunction with a bellows-type diaphragm 38. The collapsible and expansible bellows 38 seals off an air chamber 34 between plates 36 and 42 at the edges of a square area of the lower surface of plate 36 and of the upper surface of plate 42. Jacking pressure-air is fed from source 22 through conduit 26 to a channel or bore 52 in plate 36. The bore may be molded into plate 36 in casting or the bore may be drilled or otherwise machined thereinto.

Chocks 40 are provided for holding the plate 36 in elevated position when the dolly must remain in cooperation with a pallet for extensive periods of time, thereby obviating the necessity of operating the compressor for long periods of time. As one type of spacer means for this purpose that are contemplated for this purpose, chocks 40 may well consist of a pair of blocks hinged at their inner edges to the plate 42 so that they can be raised into the broken lines position shown to support plate 36 or lowered into the solid lines position when it is desired to collapse the dolly. However, suitable toggle links, or the like, properly arranged, could also well be employed to these ends.

The portion 46 at the lower side of the dolly consists of a centrally perforate, yieldable and dimensionally recuperative pad; that is, a lamina of elastomeric foamed plastic, or equivalent, material faced off with a tough, abrasive-resistant facing 48 and attached in face-wise parallelism to the lower face of plate 42 and serving as a cushion for the dolly that somewhat conforms to rugosities in the floor.

The primary means for eliminating floor-friction resides in the continuously flowing layer of air across the entire extent of the lower face of the facing-off sheet 48 produced by means of the compressor 22, conduit 28 and bore 54. This air debouches through mouth 58 in the clamping plates 56 into a plenum chamber 60 which is substantially centrally located with respect to the laminae 46 and 48.

As this air escapes around the periphery of the dolly in the form of a layer 62, it elevates the dolly about 1/32 inch and, in doing so, materially reduces the sliding friction between the dolly and the ground-plane.

Figure 2:
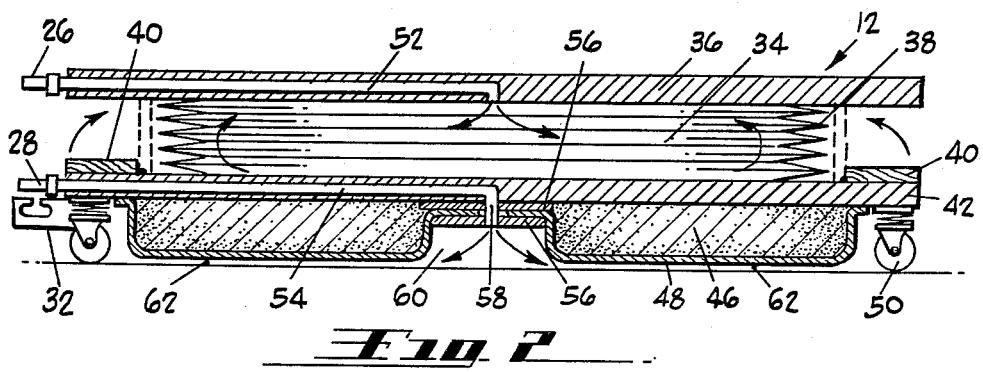
FIG. 2 is a longitudinal, substantially central vertical section of the portable lifting and lowering dolly constituting a major component of this invention with the lifting platform thereof air-elevated.

In FIG. 3, the dolly is constructed much the same as in FIG. 2 except that the two bores or conduits 52 and 54 for respectively feeding air to chamber 34 and to create the layer 62 are consolidated as one bore 55 terminating at its inner end in a T or double-outlet 64 that simultaneously fills chamber 34 and forms the layer 62.

It will be obvious that when the pressure air is fed through bore 55 to float the dolly of FIG. 3 it will simultaneously expand chamber 34 and raise pallet-lifting plate 36 to such height that it cannot enter under a pallet. To obviate this difficulty casters 50 are mounted at the corners of base plate 42. These casters are spring-biased, by means shown as 50A, and the springs are so selected that they will expand and extend the castering wheels, thus constituting the group 50—an extensible wheel means that will support the dolly with its lower surface elevated above the ground plane sufficiently to translate the dolly without dragging. Thus the dolly can be readily moved into its proper position under the pallet. Pressure air is then applied, plate 36 is raised into load-supporting position and the load is taken on the floatation film 62. Casters 50 still contact the ground plane but exert only a low unit pressure representing approximately the weight of the unloaded pallet. This pressure is insufficient to cause damage to even the softest or weakest floors encountered in cargo handling operations.

While casters 50 are not essential in the operation of the other forms of the inventions they are desirable and can be used with any of them, as indicated in FIG. 2. When the dolly in any of its forms is to be translated unloaded as in storing it in an out-of-the-way position it can be readily moved on the casters without the necessity for attaching an air supply. This is a great convenience when large numbers of dollies are to be stored out of service, as in a warehouse.

In FIG. 4, rather than utilizing one continuous footing as shown in FIG. 2, which is however, quite satisfactory for ordinary factory floors and other more or less regular ground-planes, there are provided a plurality of small, separate and separately mounted feet 66. In one form, as indicated in FIG. 5, six of these feet 66 are employed and since they can individually adjust to quite rough terrain, as on a flying field or airport, they extend the range of utility of the invention a material amount.

Each foot of FIGS. 4 and 5 comprises a rectangular base plate 70 united at each of its corners to the plate 42 by an inverted, conical, helically coiled spring 68 of wide conical angle, each spring being rather large in relation to the size of the foot 66. To the lower face of each plate 70 there is facewise attached a laminated pad 72, each pad being constructed in essence as is the single one in FIG. 2. That is, each consists of an elastomeric core 74 and a skin 76.

By means of these large, wide-angle, inverted cone helically coiled springs, each individual foot is endowed with considerable stability and tends to return to its upright position after side loads are removed therefrom, being aided by the buoying effect of the floatation and lubricant layer of air underneath them.

From the conduit 54, a flexible sub-conduit 78 leads to the perforate center of each of the feet passing through an outlet fitting 80 so that air enters each of the plenum chambers 82, as, and for the purposes, aforementioned with respect to FIG. 2.

In all other essential respects, the dolly of FIG. 4 is substantially the same as that of FIG. 2.

Instead of using the coil spring mounted feet just described, the dolly can be provided with feet which are rotatably and tiltably mounted by a ball and socket type connection as disclosed in the application of T. K. Petersen and G. A. Thompson for patent on Air Film Supported Weighing Jack, now Patent No. 3,119,598.

In the bottom sectional plan view constituting FIG. 6, there is shown a pallet constructed quite differently from that of the preceding figures in that it consists of a rectangular top plate 86 provided at each corner with a leg 88 and also bearing a medial or central leg 92.

A novel dolly 84 is provided to cooperate with this pallet and the dolly consists of a C-planform top plate 84 bearing seven individual feet 72 each constructed and functioning substantially like those of FIG. 4. Since with this arrangement air must be delivered through several distribution conduits 54, multi-ported block 90 is provided in communication with conduit 28 and has outlet ports respectively communicating with each of conduits 54.

It follows that the dolly can be applied to the pallet from the confronting end, the rear end, or from either side, whichever may be most convenient for approaching the dolly to the pallet or for snugly storing the pallet and its load or a container in a given storage space.

If the bottom of a container itself constituted an airglide face, as in one form of the patent mentioned above, it might occur that the air base would be facing in an awkward attitude, but with the pallet of FIG. 6, or with a container bottom similarly constructed, no such problem will arise, since the dolly can be applied from any one of four sides.

The mode of assembling the various dollies under their respective pallets and of lifting and translating the various loaded pallets is deemed to be self-evident upon referring to the foregoing detailed description. It is to be borne in mind, however, that very little manual effort, applied only to the rollable, light-weight power pack is necessary in order to move a dollied-up pallet bearing a given load, from place to place, no matter how rugose the ground plane may be. When not in use and when in use as well, of course, the combination occupies a relatively small floor space and volume, seldom being in the separated mode shown in FIG. 1.

It will be apparent to those skilled in the art that various changes and modifications may be made in construction and arrangements disclosed herein without departing from the spirit of the invention, and it is intended that all such changes and modifications shall be embraced within the scope of the following claims.

I claim:

1. A pneumatic dolly, comprising: upper and lower, parallel plates; diaphragm means airtightly uniting said plates adjacent their peripheries; conduit means in the upper member for leading pressurized air into the sealed spaced between plates; yieldable means mounted facewise to the lower face of the lower plate, said yieldable means including a plenum chamber; conduit means leading pressurized air into said plenum chamber; and castering means at each corner of said dolly for supporting it slightly elevated above the ground-plane.

2. A pneumatic dolly, comprising: upper and lower, parallel plates; diaphragm means airtightly uniting said plates adjacent their peripheries; conduit means in the upper member for leading pressurized air into the sealed space between the plates; yieldable means mounted facewise to the lower face of the lower plate, said yieldable means including a plenum chamber; conduit means leading pressurized air into said plenum chamber; castering means at each corner of said dolly for supporting it above the ground-plane; and rigid spacer means mounted to the upper surface of the lower plate at each end thereof and normally lying flat thereon and being pivotable into a vertical, plates-spacing position.

3. A pneumatic dolly, comprising: upper and lower parallel plates; yieldable means mounted facewise to the lower plate and including a plenum chamber, diaphragm means airtightly uniting said plates adjacent their peripheries to form a jacking chamber; and pressure air conduit means traversing the lower plate and terminating inwardly in a vertical T, the respective upper and lower arms of the T opening into the jacking chamber and the plenum chamber.

4. A pneumatic dolly, comprising: upper and lower parallel plates; diaphragm means airtightly uniting said plates adjacent their peripheries; conduit means for leading pressurized air into the sealed space between plates; a plurality of discrete feet each being resiliently united to the lower face of the lower plate, each of said feet including a plenum chamber, said conduit means further leading pressurized air into each of said plenum chambers.

5. A dolly comprising: a pair of parallel, vertically spaced rigid planar members being C-shaped in planform so as to provide a medial gap extending longitudinally from one end of the dolly almost to the opposite end thereof; diaphragm means extending between the C-shaped members and united to same adjacent their peripheries so as to define a closed chamber expansible to elevate the upper member; means for leading pressurized air into said chamber to expand same; a plurality of individual feet each resiliently attached to the lower face of the lower one of said rigid members, each of said feet comprising a rigid plate faced off on its lower face with a yieldable member that includes a plenum chamber; and means leading pressurized air to each of said plenum chambers.

6. Load raising and transporting assembly means comprising: a lower plate-like member; an upper plate-like member adapted to have a load supported thereon; pressure fluid operated jack means interposed between the plate-like members for raising and lowering the upper member with respect to the lower member; air floatation means affixed to the underside of the lower plate-like member and being adapted to support the aforesaid assembly means in substantially friction free sliding contact with a floor-like surface; means supplying pressurized fluid to the jack means and to the air floatation means; extensible wheel means for elevating the foregoing assembly with the air floatation means out of contact with the floor-like surface to provide rolling support for the assembly when unloaded and when air is not being supplied to the air floatation means.

7. Load raising and transporting assembly means comprising: a lower support member; an upper support member adapted to have a load placed thereon; jack means interposed between the lower and upper members for raising and lowering the upper support member with respect to the lower support member; air floatation means affixed to the lower member and being adapted to contact a generally planar surface across which the load is to be moved and providing substantially friction free sliding contact thereacross; separate, ground supported portable air supply means rigidly coupled to the lower support means whereby movement imparted to the air supply means effects movement of the support means, said air supply means being in communication with and furnishing pressurized air to the air floatation means; means controlling the flow of air to the air floatation means whereby the momentum of the load when sliding across the planar surface can be quickly overcome by stopping the flow of air to place the floatation means in high friction contact with the planar surface.

8. The assembly as defined in claim 7 wherein extensible wheel means are attached to the lower support member and when extended maintain the air floatation means out of contact wih the planar surface.

9. The assembly as defined in claim 6 wherein chock means are interposed between the upper member and the lower member and maintain the upper member in elevated position in the event of loss of power to the jack means.

10. A portable self contained load lifting and translating means comprising: an upper support adapted to have a load positioned thereon; a lower support; jack means acting between the upper and lower supports for elevating the upper support; air floatation pad means affixed to the underside of the lower support and being adapted to contact a planar floor-like structure in sliding, substantially friction free, contact therewith; a separate, ground supported source of air in communication with the air floatation pad means, said source of air being coupled to and translatable in unison with said support means; handle means extending from the foregoing assembly whereby an operator can exert translating forces to the load through the handle means; and control means adjacent said handle means, said control means regulating the flow of air from said source to said air floatation pad means.

11. In combination: a source of pressurized air; an oblong pallet having means at each corner for spacing same off the ground in parallelism thereto and also having one such means substantially at the center of the pallet; pneumatic jack means cooperatively arranged underneath the pallet and having an upper portion and a lower portion; said jack means being C-shaped in planform and including a pair of parallel members normally spaced vertically apart; diaphragm means air-tightly connecting the periphery of the upper face of the lower member to the periphery of the lower face of the upper member; means in the upper portion of said jack-means which are connected to said pressurized air source for jacking up the upper member of said jack means; means in the lower part of the jack means connected to said source for buoying up the jack means, as a unit, from the ground plane; and means for decouplably coupling the jack means and said pressurized air source; said C-shaped jack-means being nestable in the concavity defined on the lower face of said pallet by said spacing means and the lower face of said jack means.

12. A cargo dolly adapted for substantially friction free sliding contact with a floor-like supporting surface, comprising: a load bearing member; air floatation means affixed to the underside of said load bearing member and adapted to support the member and its load in substantially friction free sliding contact with a supporting surface; means to lead pressurized air to said air floatation means for outflow between it and the supporting surface; and vertically movable wheel means supporting the dolly and maintaining the air floatation means spaced above the supporting surface when the dolly is unloaded; said wheel means being movable to permit the air floatation means to contact the supporting surface when the dolly is loaded.

13. A cargo dolly as claimed in claim 12; said wheel means being mounted to the dolly by yieldable means having sufficient resistance to support the unloaded dolly out of contact with the supporting surface, and insufficient resistance to support the dolly when the latter bears any appreciable load.

14. A cargo dolly adapted for translation across an uneven surface in close juxtaposition thereto, comprising: a substantially rectangular flat horizontal load bearing platform; a plurality of discrete feet each secured to the undersurface of said platform for universal tilting movement with respect thereto, including a foot under each corner of the platform and at least one intermediate foot; the total surface-confronting area of said feet being a major portion of the area of said platform; each of said feet including a plenum chamber at its lower side; and means to lead pressurized air to each plenum chamber to flow out therefrom in a thin film between the lower face of each foot and the supporting surface and serve as a lubricant to reduce the coefficient of friction substantially to zero; the individual tiltable mounting allowing each foot to conform to the individual attitude of that portion of the uneven supporting surface confronting it to minimize the rate of outflow of the lubricating air film; the quantity and arrangement of said feet under said platform insuring that, in the event of substantially complete loss of the air film under any one foot, the remaining feet will sustain said platform in normal attitude with no significant increase in total ground friction resistance to translation.

15. A cargo dolly as claimed in claim 14; each of said feet being resiliently mounted to enable them to individually yield vertically to conform to local irregularities of height in the supporting surface, whereby the majority of the feet determine the basic attitude of the platform.

16. A cargo dolly as claimed in claim 14; said platform being generally C-shaped in planform; and said feet being arranged in corresponding planform to accommodate pallets having central ground engaging supports.

References Cited by the Examiner
UNITED STATES PATENTS

| | | | |
|---|---|---|---|
| 1,297,091 | 3/19 | Canfield | 254—93 |
| 1,447,242 | 3/23 | Fritz | 254—93 |
| 2,609,177 | 9/52 | Hughes | 254—93 |
| 2,626,552 | 1/53 | Oehler et al. | 280—421 |
| 2,918,183 | 12/59 | Peterson et al. | 180—1 |
| 2,938,590 | 5/60 | Barnett | 180—7 |
| 3,019,930 | 2/62 | Allen | 180—7 |
| 3,119,598 | 1/64 | Peterson et al. | 180—7 X |

FOREIGN PATENTS

| | | |
|---|---|---|
| 807,389 | 6/36 | France. |
| 1,238,499 | 6/60 | France. |

OTHER REFERENCES

Popular Science, May 1960, pages 154, 155, 157, 158.

FERGUS S. MIDDLETON, *Primary Examiner.*

PHILIP ARNOLD, A. HARRY LEVY,
MILTON BUCHLER, *Examiners.*